United States Patent [19]

Andruska et al.

[11] Patent Number: 5,550,904
[45] Date of Patent: Aug. 27, 1996

[54] METHOD FOR IDENTIFYING THE ORIGINATING NETWORK AT THE TERMINATING NETWORK FOR TRANSNETWORK CALLS

[75] Inventors: Donald L. Andruska, Glen Ellyn; Thomas C. Ruvarac, Aurora, both of Ill.

[73] Assignee: Lucent Technologies Inc., Murray Hill, N.J.

[21] Appl. No.: 538,872

[22] Filed: Oct. 4, 1995

Related U.S. Application Data

[63] Continuation of Ser. No. 129,282, Sep. 30, 1993.

[51] Int. Cl.⁶ .................. H04M 15/00; H04M 15/06; H04M 3/00; H04M 3/42
[52] U.S. Cl. .................. 379/127; 379/112; 379/115; 379/142; 379/188; 379/189; 379/201; 379/196; 379/198; 379/207; 379/220; 379/221; 379/225; 379/230
[58] Field of Search .................. 379/112, 115, 379/127, 142, 188, 189, 196, 197, 198, 201, 207, 220, 221, 225, 230

[56] References Cited

U.S. PATENT DOCUMENTS

| | | | |
|---|---|---|---|
| 4,348,554 | 9/1982 | Asmuth | 379/221 |
| 4,464,543 | 8/1984 | Kline | 379/224 |
| 4,488,004 | 12/1984 | Bogart | 379/225 |
| 4,850,011 | 7/1989 | Delmege | 379/201 |
| 4,878,239 | 10/1989 | Solomon | 379/196 |
| 4,926,470 | 5/1990 | Sanford | 379/188 |
| 5,033,076 | 7/1991 | Jones | 379/142 |
| 5,099,509 | 3/1992 | Morganstein | 379/197 |
| 5,109,405 | 4/1992 | Morganstein | 379/188 |
| 5,200,995 | 4/1993 | Gaukel | 379/188 |
| 5,222,120 | 6/1993 | McLeod | 379/207 |
| 5,237,604 | 8/1993 | Ryan | 379/230 |
| 5,251,255 | 10/1993 | Epley | 379/207 |
| 5,255,315 | 10/1993 | Bushnell | 379/207 |
| 5,276,731 | 1/1994 | Arbel | 379/142 |
| 5,278,894 | 1/1994 | Shaw | 379/142 |
| 5,299,259 | 3/1994 | Otto | 379/207 |
| 5,311,572 | 5/1994 | Friedes et al. | 379/207 |
| 5,357,564 | 10/1994 | Gupta | 379/112 |

OTHER PUBLICATIONS

Anonymous, "Originating Network Identification (ONI) In Signaling System 7 (SS7) Messages," *International Technology Disclosures*, vol. 11, No. 9, Sep. 25, 1993, p. 5.
"I–CAN PVN/AIN Issue List", Letter from Bellcore to vendors, dated Aug. 20, 1993, 5 pages.
"Implementation of ISDN Wide Area Centrex in System 12"; by K–P–Lathia; 379/207; pp. 374–382; Electrical Communication; vol. 63, No. 4; 1989.
"Virtual Private Networks" by Michael Gawdun pp. 59, 60, 62, Telecommunications, Apr. 1986.
"Intelligent Network in France" by Goerlinger et al Electrical Comm., vol. 63, No. 4, 1989.
Private Interconnec Networks (GTE) by N. Shaye; National Telcomm. Conference, New Orleans 1981, pp. 1–8.

*Primary Examiner*—Stephen Chin
*Assistant Examiner*—Vijay Shankar
*Attorney, Agent, or Firm*—Michael B. Johannesen

[57] ABSTRACT

Relates to arrangements for utilizing an originating caller's customer network identifier (ONI) to provide special treatment of a call, especially one that terminates outside the caller's network. The ONI is recognized in an originating switching system and is transmitted in an initial address message (IAM) to the terminating switching system for serving the call. In the terminating switching system, the ONI is used to screen the call for special treatment such as denied termination, denied termination for collect calls, or direct completion to a principal of a principal-secretary group. The ONI is also used for screening for use of originating services for members of a network. The originating or terminating switch can also query a data base to obtain screening data.

20 Claims, 5 Drawing Sheets

FIG. 5

TERMINATING OFFICE SCREENING TABLE

| NI | TREATMENT |
|---|---|
| ⋮ | ⋮ |
| NI | TREATMENT |
| | |
| ⋮ | ⋮ |
| | |

Rows grouped as: TERMINATING NETWORK LEVEL (upper section) and TERMINATING LINE LEVEL (lower section).

5,550,904

METHOD FOR IDENTIFYING THE ORIGINATING NETWORK AT THE TERMINATING NETWORK FOR TRANSNETWORK CALLS

This application is a continuation application Ser. No. 08/129,282, filed on Sep. 30, 1993.

TECHNICAL FIELD

This invention relates to telecommunications calls originating in a customer network.

Problem

Many large businesses or government organizations have arranged their telecommunications services so that their employees are interconnected by a customer telecommunications network which can include one or more private branch exchanges (PBXs) interconnected by a public switched telephone network, a private network, or a combination of the two. Frequently within such customer networks, users of the network are given privileges which should be denied to outsiders. Examples of such privileges are the access to data networks containing proprietary information, access to toll telephone service, and access to voice mail. To the extent that public switched network facilities are used to interconnect the users of such a customer network, the availability of these facilities may be compromised. A problem of the prior art is that there is no satisfactory arrangement for screening out off-network calls from outside a customer network, or more generally, selectively screening access to a customer network especially from outsiders.

Solution

The above problem is solved and an advance is made over the prior art in accordance with our invention wherein a network identifier of an originating customer network is transmitted in a common channel signaling message sent to a terminating switching system to establish a call, or to a data base; the terminating switching system has translation information identifying the customer network, if any, of a called customer and has information for screening calls based on the identification of the customer network of the calling customer; the data base has information for the calling customer network which can be used, for example, to screen requests for special services (conference calls, etc.) by an originating caller of the network. Advantageously, with such an arrangement calls may be screened from all but the callers of the called customer's own network, may be screened to allow access to a limited number of other customer networks, and may allow different screening treatment (rejection, absence of call waiting, or normal call completion) depending on the calling customer's network or absence of a network of the calling customer, and service access may be screened for callers of a network.

In accordance with one feature of applicants' invention, individual customers may also have their calls screened according to the identity of the customer network of the caller, or individual lines within a customer network may have special screening. For example, the screening provided to the attendant of a customer network may be different from the screening provided to other users within the customer network.

DRAWING DESCRIPTION

FIG. 5 is a layout of a terminating switching system screening table.

DETAILED DESCRIPTION

Figure 1:
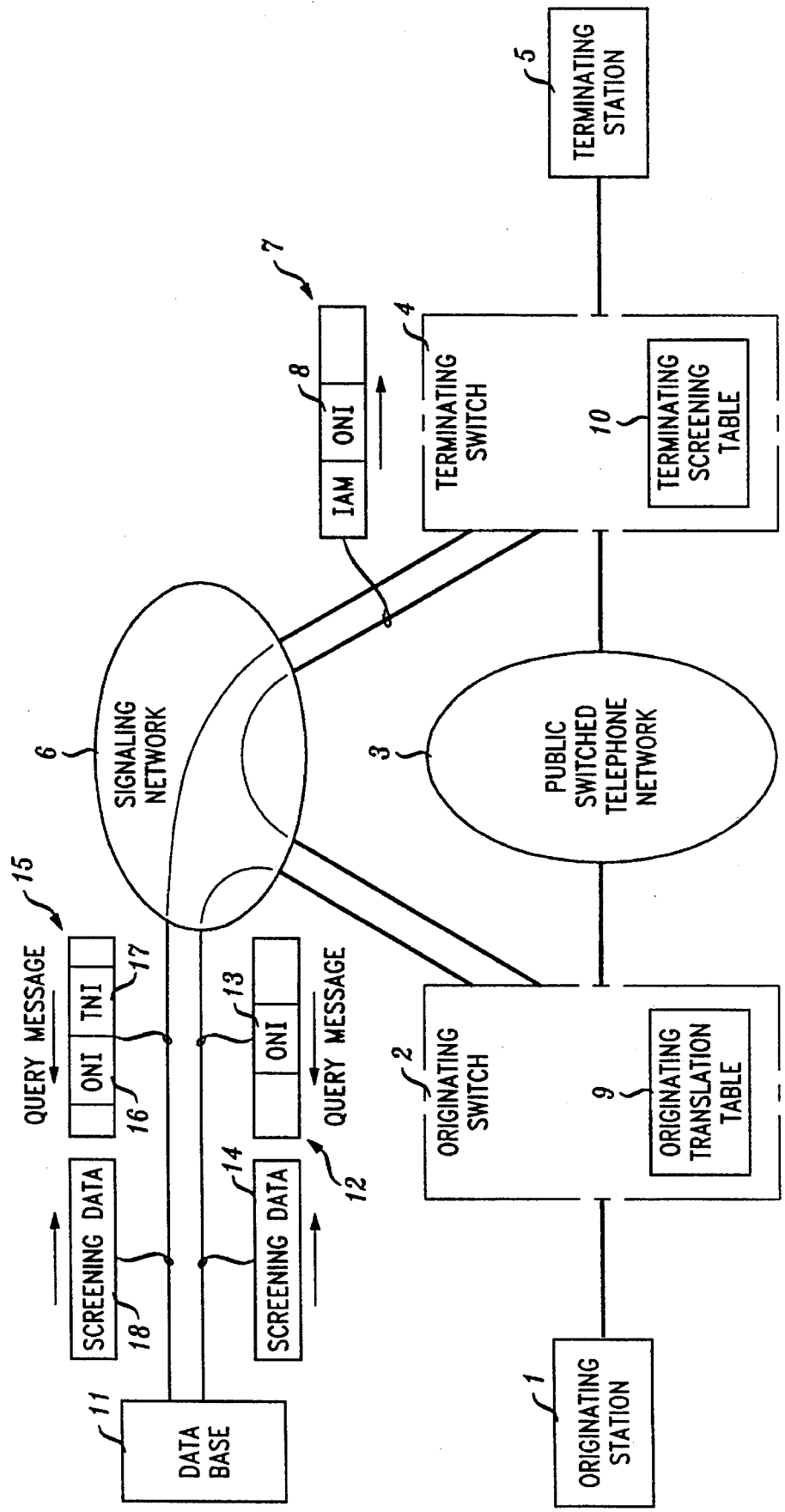
FIG. 1 is a block diagram illustrating the overall operation of applicants' invention.

FIG. 1 is a block diagram illustrating the operation of applicants' invention. An originating station 1 dials a call. The call is routed through an originating switch 2 over a public switched telephone network 3 to a terminating switch 4 and then to a terminating station 5. The originating switch signals to the terminating switch, over signaling network 6, an initial address message (IAM) identifying the called customer as well as the calling customer. In accordance with applicants' invention, this initial address message 7 (IAM) also includes a new segment 8 for transmitting the originating customer network identification (ONI) of the calling customer. The terminating switch receives the information in the IAM 7 and uses the ONI segment 8 to perform screening, using screening table 10, based on the ONI.

The query may also be to a data base 11 such as an Advanced Intelligent Network (AIN) data base. When the originating station 1 makes a service request (which need not be a call request but can be, for example, a request to establish a toll conference call) to its originating switch 2, switch 2 sends a query message 12, containing the ONI 13, via signaling network 6 to data base 11. Based on the ONI, and, for some service requests, the terminating network identifier, the data base 11 accesses its data and generates a screening response message 14 whose contents are used by originating switch 2 to process the caller's request. For example, the screening response may be an indication that the caller should be denied the request because the service is not provided to members of that originating network. A query message 15, this time indicating both an ONI 16 and a terminating network identifier (TNI) 17 can also be sent from the terminating switch 4 to data base 11; the data base responds with a message 18 containing screening data.

Figure 2:
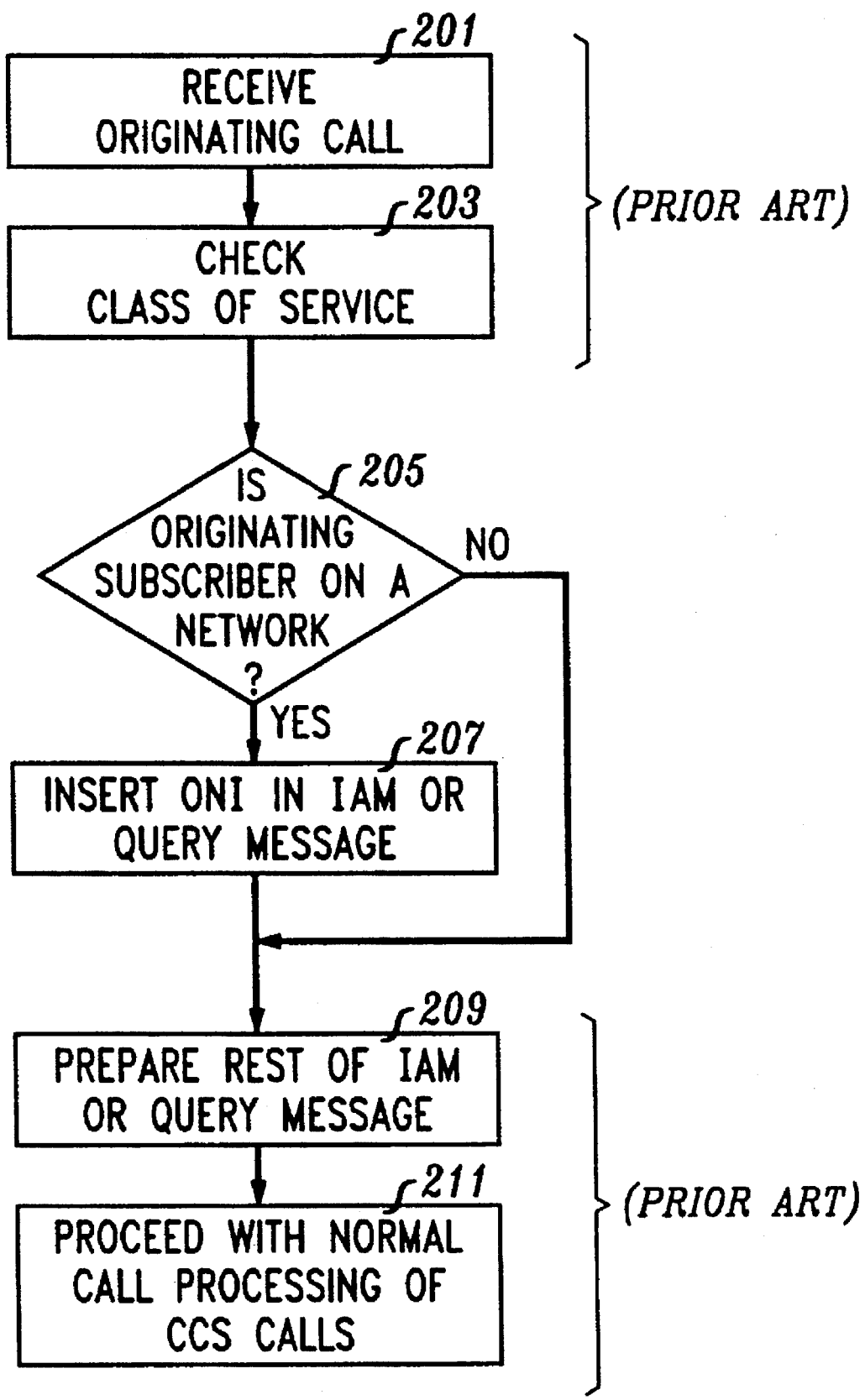
FIGS. 2–4 are flow diagrams of operations performed in originating and terminating switches and in a data base.

FIG. 2 is a flow diagram describing the special operations carded out in the originating switch 2. The switch receives an originating call (action block 201) and checks the class of service of the originating line (action block 203). In a departure from the prior art, and based on the originating translation table 9 (FIG. 1), this check includes a check to determine the originating subscriber's customer network number (ONI), if any (test 205). If the originating customer is a part of a customer network, then the ONI is inserted in the IAM message being prepared for the call or the query message being prepared for the data base (action block 207). In accordance with the prior art, the rest of the IAM or query message is also prepared (action block 209) and normal call processing proceeds for that call (action block 211).

Figure 3:
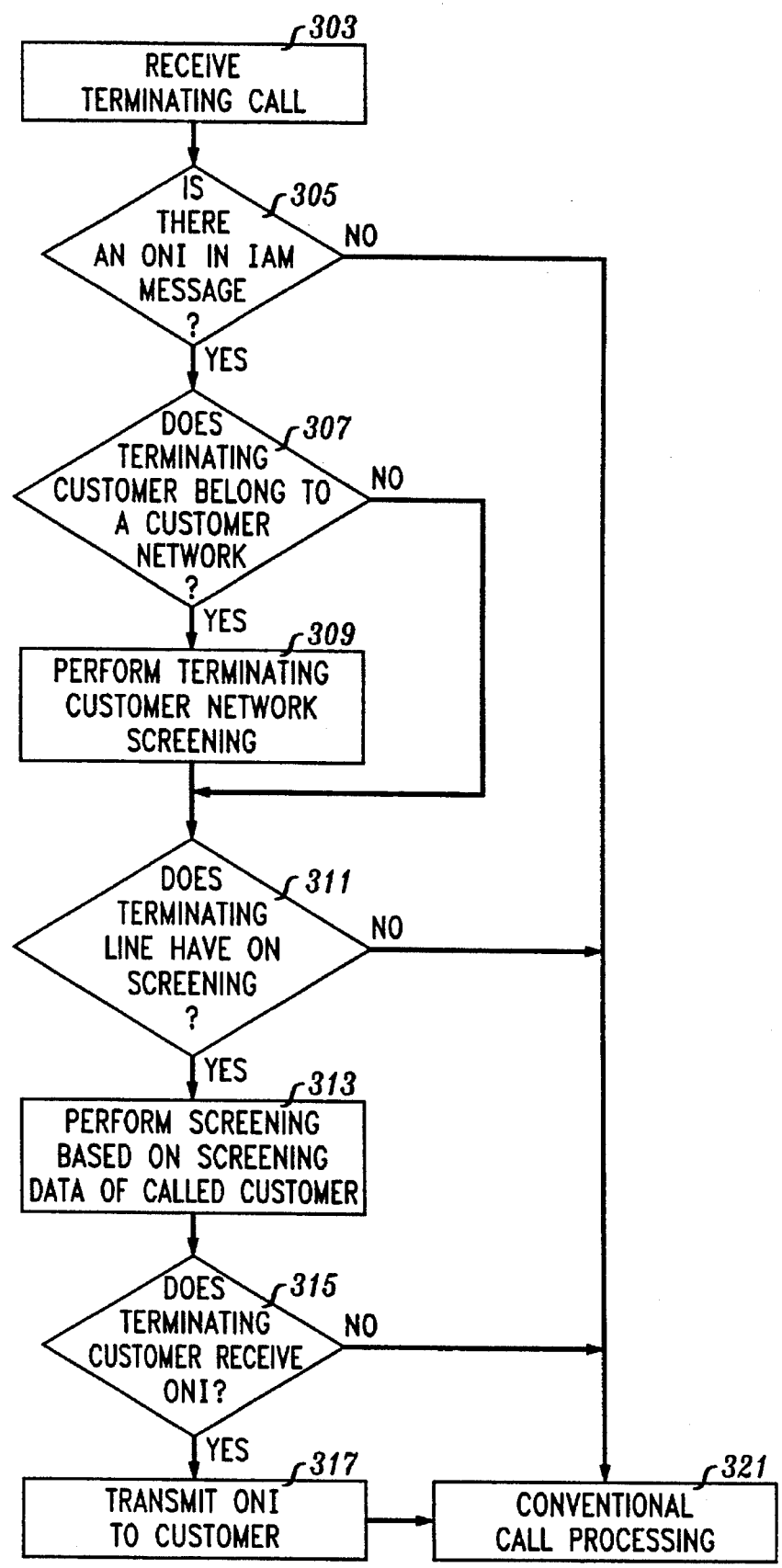

FIG. 3 illustrates the special actions taken in the terminating switching system 4. The terminating switch receives the terminating call (action block 303). In a departure from the prior art, it tests whether there is an ONI segment in the IAM message of the call (test 305). If not, the call is processed conventionally (action block 321). If an ONI segment is in the message, then the terminating office first checks to see whether the terminating customer belongs to a customer network (test 307). If so, then initial screening is performed (action block 309) based on the terminating customer network screening status stored in the terminating screening table 10 (FIG. 1). If the terminating customer does not belong to a customer network or, after performing the terminating customer network screening, a test is made to see if the terminating line has screening on its originating network (test 311). If not, conventional call processing proceeds (action block 321). If the terminating line has special screening on its originating network, then the screening is performed (action block 313) based on the screening data of the called customer. Finally, a check is made to determine whether the terminating customer has a class of service which allows it to receive the originating network identifier (test 315). If so, then the ONI is transmitted to the customer (action block 317) and conventional call processing proceeds (action block 321).

Figure 4:
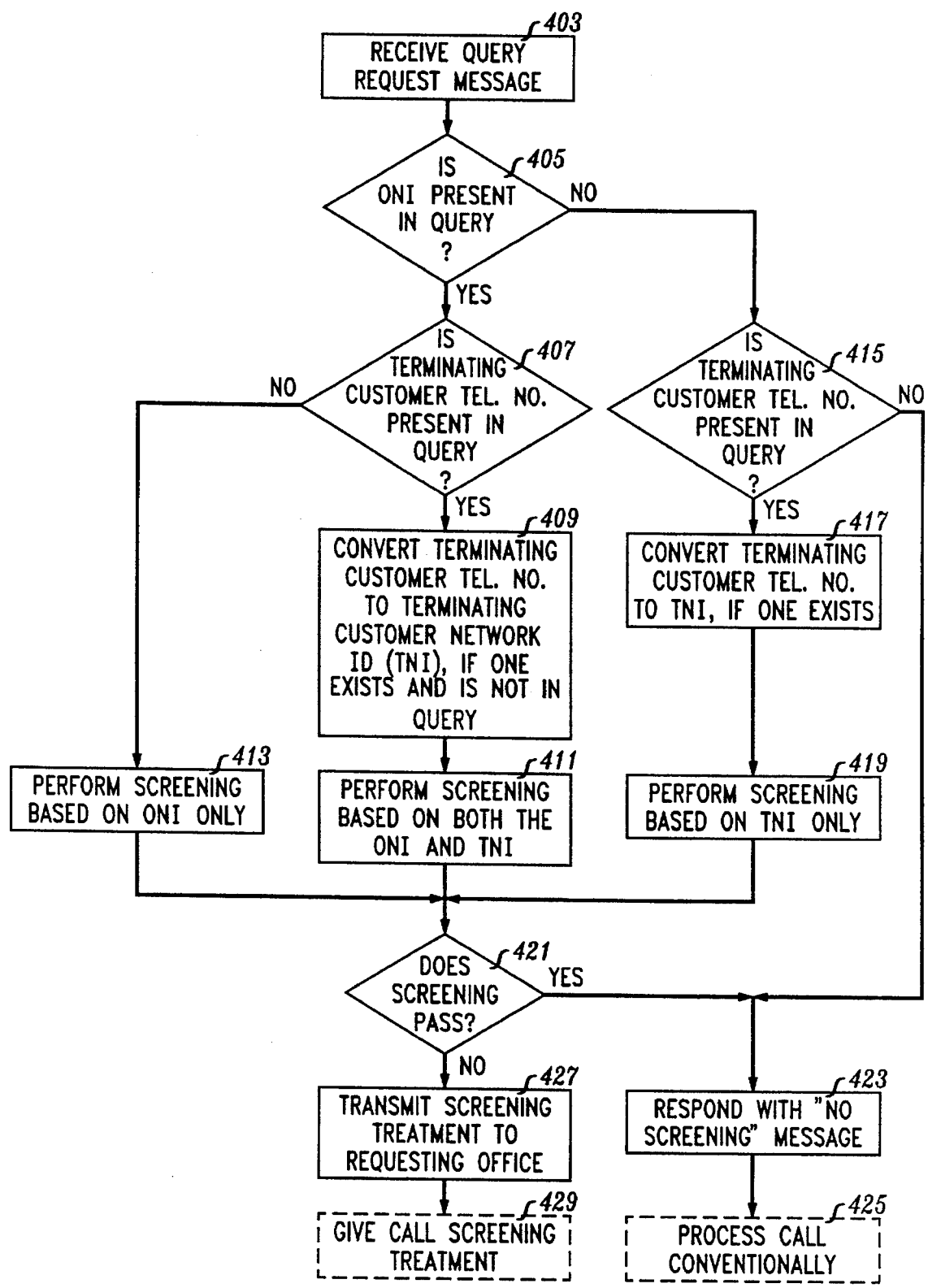

FIG. 4 illustrates actions performed at the data base 11. A query request message is received (action block 403) from either the originating or the terminating switch. Test 405 determines whether an ONI is present in the query. If so, test 407 determines if the terminating customer's telephone number is present in the query. If so, and if the terminating network identifier (TNI) is not present in the query, then the terminating customer's telephone number is convened to the TNI if one exists (action block 409). Screening is then performed based on both the ONI and, if one exists, the TNI (action block 411). If the customer's telephone number is not present in the query (negative result of test 407), then screening is based only on the ONI (action block 413). If no ONI is present in the query (negative result of test 405) then test 415 is used to determine whether the terminating customer's telephone number is present in the query. If so, then the terminating customer's telephone number is converted to the TNI if one exists and the query has not specified the TNI (action block 417). Screening is then performed based on the TNI only (action block 419). Test 421 is used after screening has been performed. Test 421 is used to determine whether the screening has passed, i.e., whether the call may be given conventional treatment. If the result of test 421 is positive, or if the result of test 415 is negative, then the data base responds with "no screening" message (action block 423) and in the switch which made the query the call is processed conventionally. If the result of test 421 is that screening does not pass, i.e., that special treatment must be given to the call, then a screening treatment message is transmitted to the requesting office (action block 427) and the requesting office gives the call the required screening treatment (action block 429). (Action blocks 425 and 429 are in dashed lines because they are performed in the requesting office, not in the data base.)

FIG. 5 shows the data stored in the terminating office screening table 10 (FIG. 1) for each terminating customer, or terminating customer network that has screening facilities. The table consists of two different screening types: (1) a per terminating customer network screening list, and (2) a per customer line screening list. Each of these screening lists is provided with a default treatment of "no screening indicated" to be used when screening does not apply. This allows two levels of screening based on the received ONI. Each screening list contains a list of network identifiers and the corresponding treatment given to calls from that network.

As mentioned previously, a terminating customer might not be part of a customer network, but can still have per line screening. In this case, the terminating customer's terminating screening table would use the default (no screening indicated) in the network screening list and the per customer line screening list would be populated based on the terminating customer's requests. When a terminating customer is pan of a customer network, the screening table would be populated differently. The network screening list would be populated according to the terminating customer network administrator's request and would be common to all terminating customers in that customer network. The per customer line screening list would be populated based on the terminating customer's requests, and would vary from one customer to the next.

The special treatments provided through screening include all appropriate features of Local Area Signaling Service (LASS), well known to practitioners of the telephone switching art. These treatments include denial of call completion, direct routing to a principal's telephone, routing to an attendant's phone (either a secretary, a business attendant, or a special security attendant), denial of completion of collect calls, automatic forwarding of the call, placing the call on hold, providing priority ringing to the call, and forwarding a call to a preselected voice mailbox or denying access to voice mail.

It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. A method of identifying an originating customer network to a terminating network for a call comprising the steps of:

identifying an originating customer network of a caller of said call by determining its originating network identification (ONI);

delivering said call across a network boundary as determined by said ONI not matching a network identification of said terminating network, transmitting said ONI of said customer network to a terminating switching system in said terminating network serving said call; and delivering said ONI to a called party.

2. The method of claim 1 further including making a terminating translation based on a called telephone number of said call and on said delivered ONI.

3. The method of claim 1 wherein said ONI is transmitted in an Initial Address Message.

4. In a telecommunications switching system, apparatus for providing special screening terminating treatment to a telecommunications call, comprising:

means for receiving a common channel signaling message, said message comprising an ONI (originating network identifier) of a calling customer's network, and an identification of a called customer;

means for determining whether said ONI and a network identifier of a terminating network receiving said call are different;

a screening table for screening incoming calls responsive to said determining means determining that said ONI and a network identifier of said terminating network receiving said call are different; and means, responsive to receipt of said message said identification of a called customer and said ONI, and using said screening table for determining what special screening treatment should be provided for said call.

5. The apparatus of claim 4 wherein said message is an Initial Address Message.

6. The method of claim 1 wherein said identifying comprises making an originating translation for said caller in an originating switching system of said call.

7. The method of claim 6 wherein said transmitting comprises transmitting from said originating switching system.

8. The method of claim 1 wherein the step of transmitting comprises transmitting over a common channel signaling (CCS) system.

9. The method of claim 1 further including using said delivered ONI and said identification of a called customer for determining which one of a plurality of special screening treatment should be provided for said call.

10. The method of claim 9 wherein said special screening treatment comprises denial of a requested service.

11. The invention of claims 9 or 4 wherein said special screening treatment comprises denied call completion.

12. The invention of claims 9 or 4 wherein said special screening treatment comprises completion to a principal's telephone.

13. The invention of claims 9 or 4 wherein said special screening treatment comprises automatic direct completion to an attendant's telephone.

14. The invention of claims 9 or 4 wherein said special screening treatment comprises denied call completion for collect calls.

15. The invention of claims 9 or 4 wherein said special screening treatment comprises forwarding the call.

16. The invention of claims 9 or 4 wherein said special screening treatment comprises placing the call initially on hold.

17. The invention of claims 9 or 4 wherein said special screening treatment comprises providing priority ringing to said call.

18. The invention of claims 9 or 4 wherein said special screening treatment comprises forwarding said call to a preselected voice mailbox.

19. The invention of claims 9 or 4 wherein said special screening treatment comprises denying access to voice mail.

20. A method of providing special screening treatment to a telecommunications call comprising the steps of:

identifying a customer network of a caller of said call;

identifying a customer network of a called party of said call;

transmitting the identification of said caller customer network, an ONI (originating network identifier), and of said called party customer network, a TNI (terminating network identifier), to a data base system for serving said call;

means for determining whether said ONI and said TNI are different;

responsive to said determining means determining that said ONI and TNI are different; using said ONI and said TNI for determining what special screening treatment should be provided for said call; and transmitting data representing said special screening treatment to a switching system for serving said call.

* * * * *